(12) United States Patent
Prather et al.

(10) Patent No.: US 6,431,507 B2
(45) Date of Patent: Aug. 13, 2002

(54) VIDEO CAMERA SUPPORT DEVICE

(75) Inventors: Vance A. Prather, Fremont; John Brooks, Larkspur; Sammy Cheuksang Tsang, Alameda; Paul Hamerton-Kelly, Berkeley; Jochen Backs, San Francisco, all of CA (US)

(73) Assignee: Logitech Europe S.A. (CH)

(*) Notice: Subject to any disclaimer, the term of this patent is extended or adjusted under 35 U.S.C. 154(b) by 0 days.

(21) Appl. No.: 09/778,385

(22) Filed: Feb. 6, 2001

Related U.S. Application Data

(63) Continuation-in-part of application No. 29/127,147, filed on Jul. 31, 2000, now Pat. No. Des. 446,538, which is a continuation-in-part of application No. 29/119,498, filed on Mar. 1, 2000, now Pat. No. Des. 440,244.

(51) Int. Cl.[7] .............................................. F16M 11/38
(52) U.S. Cl. ....................................... 248/166; 396/421
(58) Field of Search ................................. 248/166, 168, 248/163.1; 396/421, 419, 428, 535–541

(56) References Cited

U.S. PATENT DOCUMENTS

| | | | |
|---|---|---|---|
| 4,526,308 A | 7/1985 | Dovey | 224/265 |
| 4,648,698 A * | 3/1987 | Iwasaki | 396/419 X |
| 5,538,212 A | 7/1996 | Kennedy | 248/215 |
| 5,650,821 A * | 7/1997 | Hewlett | 396/421 X |
| 5,708,890 A * | 1/1998 | Nakano | 396/419 X |
| 5,855,343 A | 1/1999 | Krekelberg | 248/121 |
| 5,880,783 A | 3/1999 | Ma | 348/373 |
| 6,007,259 A * | 12/1999 | Mori et al. | 396/428 |
| 6,254,044 B1 * | 7/2001 | Lee | 248/163.1 X |

* cited by examiner

*Primary Examiner*—Ramon O. Ramirez
(74) *Attorney, Agent, or Firm*—Townsend and Townsend and Crew LLP

(57) ABSTRACT

Embodiments of the present invention provide a simple, versatile support frame for supporting a camera on different objects and surfaces in various dispositions. The support frame allows different adjustments to be quickly and easily made to position the camera as desired. In one embodiment, a device for supporting a camera comprises a neck configured to connect with the camera. A body has a body axis and is rotatably connected with the neck to pivot relative to the neck around a neck pivot axis which is generally perpendicular to the body axis. A left arm is rotatably connected with the body to pivot relative to the body around a left pivot axis. The left pivot axis is nonparallel to the neck pivot axis. A right arm is rotatably connected with the body to pivot relative to the body around a right pivot axis. The right pivot axis is nonparallel to the neck pivot axis. The left arm and right arm may be pivotable relative to the body independently of one another.

20 Claims, 8 Drawing Sheets

VIDEO CAMERA SUPPORT DEVICE

CROSS-REFERENCES TO RELATED APPLICATIONS

This application is a continuation-in-part of U.S. patent application Ser. No. 29/127,147, filed Jul. 31, 2000 now U.S. Pat. No. 0,446,538, which is a continuation-in-part of U.S. patent application Ser. No. 29/119,498, filed Mar. 1, 2000 now U.S. Pat. No. 0,440,244.

BACKGROUND OF THE INVENTION

The present invention relates to devices for supporting a camera such as a video camera or a CCD (charge coupled device) camera.

Video cameras for computers have become increasingly common. For a CRT monitor having a sufficiently wide, generally planar surface on the top, a camera may be placed on the top surface using a flat support, a tripod structure, or the like. For a laptop computer, the display screen is relatively thin so that conventional structures typically do not provide stable support of the camera on the laptop screen and do not allow adequate adjustments to be made to position the camera easily and quickly.

SUMMARY OF THE INVENTION

Embodiments of the present invention provide a simple, versatile support frame for supporting a camera on different objects and surfaces in various dispositions. The support frame allows different adjustments to be quickly and easily made to position the camera as desired.

In accordance with an aspect of the present invention, a device for supporting a camera comprises a neck configured to connect with the camera. A body has a body axis and is rotatably connected with the neck to pivot relative to the neck around a neck pivot axis which is generally perpendicular to the body axis. A left arm is rotatably connected with the body to pivot relative to the body around a left pivot axis. The left pivot axis is nonparallel to the neck pivot axis. A right arm is rotatably connected with the body to pivot relative to the body around a right pivot axis. The right pivot axis is nonparallel to the neck pivot axis.

In some embodiments, the left pivot axis is nonparallel to the right pivot axis. Both the right and left pivot axes may be generally perpendicular to the body axis. The left pivot axis is spaced from the neck pivot axis by a left pivot angle and the right pivot axis is spaced from the neck pivot axis by a right pivot angle which is opposite from the left pivot angle. The right pivot angle and the left pivot angle are substantially equal in magnitude, which may be about 20°–70°. The left arm and right arm are movable relative to the body between a collapsed position and an extended position. The left and right arms are disposed adjacent the body in the collapsed position, and are angularly spaced from the body axis of the body in the extended position. The left and right arms each may include a hooked distal end. The left arm and the right arm are pivotable relative to the body independently of one another.

In one disposition, the body and the left and right arms are configured to contact a planar surface at three spaced contact locations, respectively, in the extended position to support the camera on the planar surface. In another disposition, the body and the left and right arms are configured to straddle an edge in the extended position to support the camera on the edge. The body is disposed on one side of the edge and the left and right arms being disposed on another side of the edge opposite from the body.

In accordance with another aspect of the invention, a device for supporting a camera comprises a neck configured to connect with the camera, and a body having a body midplane and being rotatably connected with the neck to pivot relative to the neck around a neck pivot axis which is generally perpendicular to the body midplane. A left arm is rotatably connected with the body to pivot relative to the body. A right arm is rotatably connected with the body to pivot relative to the body. The left arm and the right arm are independently movable to pivot separately relative to the body.

In accordance with another aspect of the invention, a device for supporting a camera comprises a body being configured to support the camera. A left arm is rotatably connected with the body to pivot relative to the body around a left pivot axis. A right arm is rotatably connected with the body to pivot relative to the body around a right pivot axis. The right pivot axis is nonparallel to the left pivot axis. The left arm and right arm are movable relative to the body between a collapsed position and an extended position. The left and right arms are disposed adjacent to the body in the collapsed position. The left and right arms are angularly spaced from the body axis of the body in the extended position. The body and the left and right arms are configured to contact a planar surface at three spaced contact locations, respectively, in the extended position to support the camera on the planar surface in a first disposition. The body and the left and right arms are configured to straddle an edge in the extended position to support the camera on the edge in a second disposition, with the body being disposed on one side of the edge and the left and right arms being disposed on another side of the edge opposite from the body.

DESCRIPTION OF THE SPECIFIC EMBODIMENTS

Figure 1:
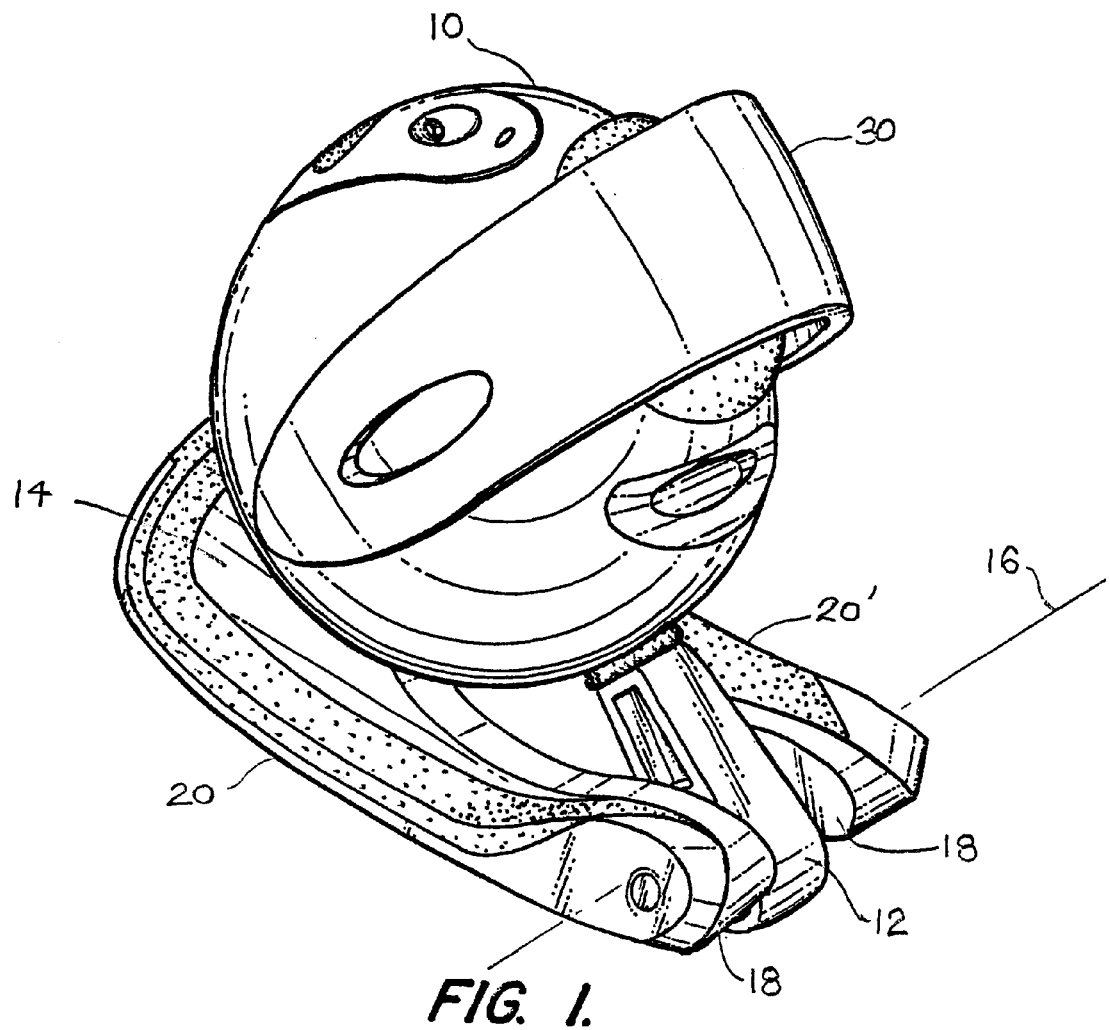
FIG. 1 is a perspective view of a video camera support device in a folded position in accordance with an embodiment of the present invention.
Figure 2:
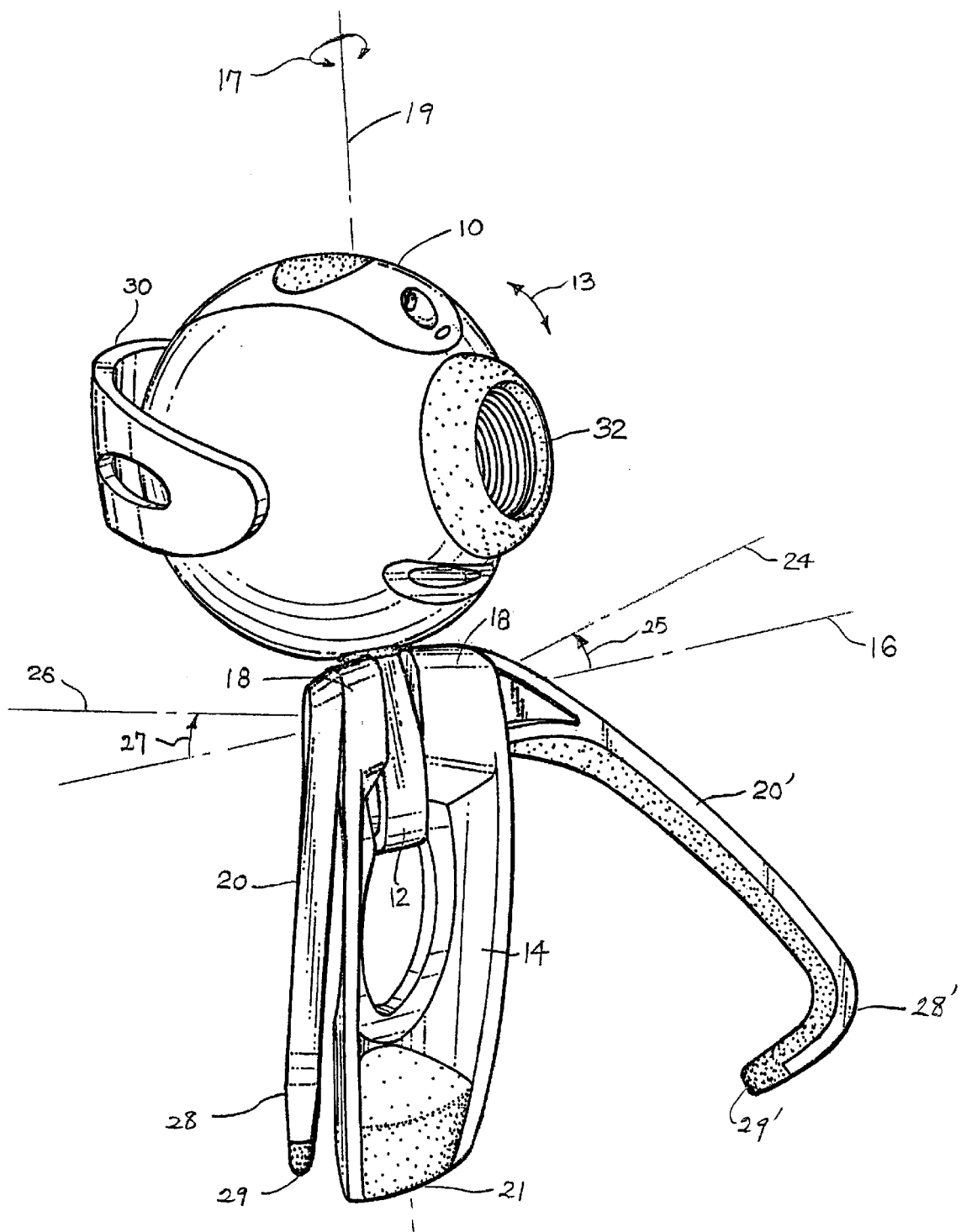
FIG. 2 is a perspective view of the support device of FIG. 1 in an extended position.
Figure 3:
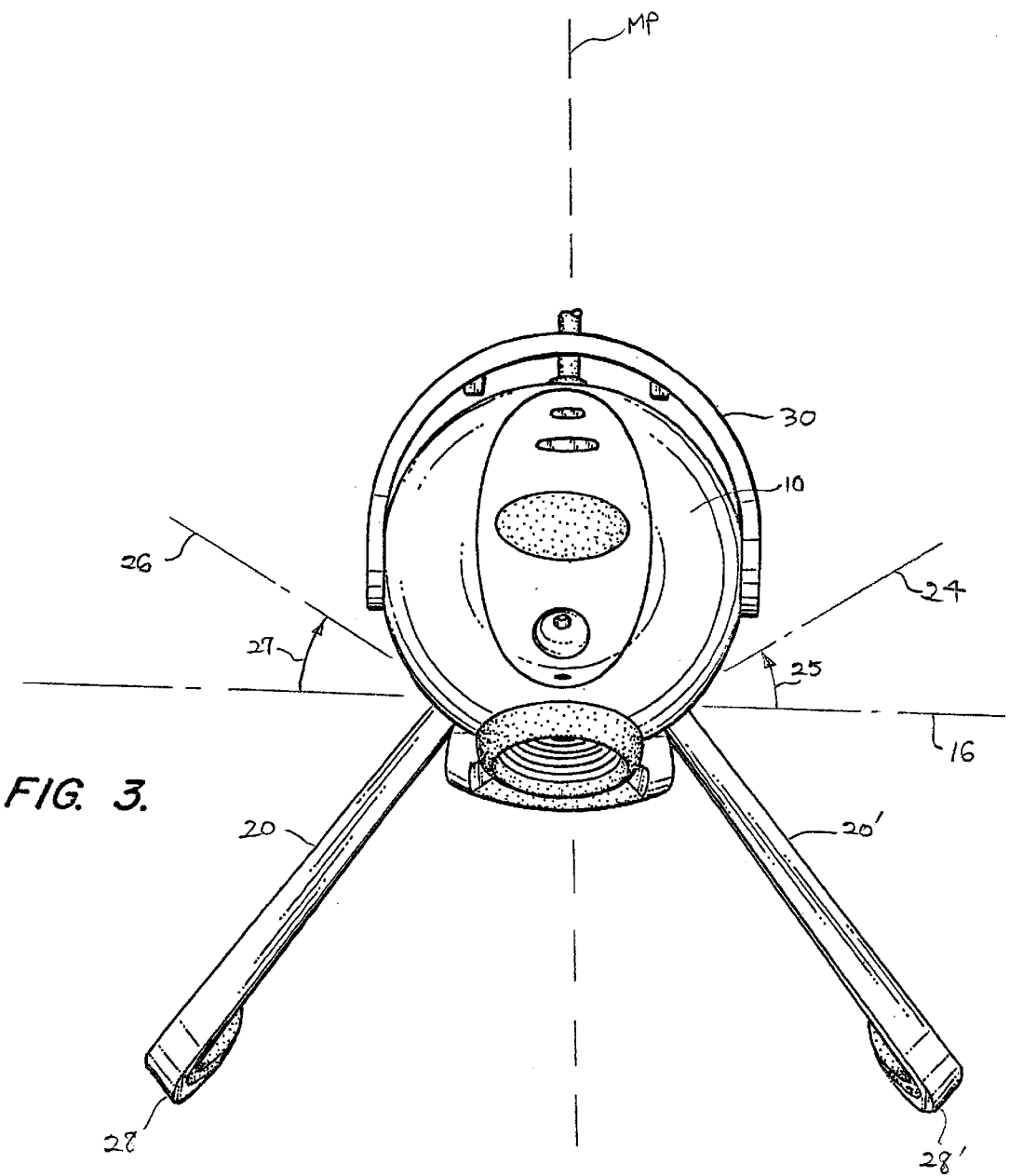
FIG. 3 is a top plan view of the support device of FIG. 2.

As shown in FIGS. 1–7, the camera 10 is connected to a neck 12 which is rotatably coupled to a body 14 to pivot up and down about a neck pivot axis 16 extending across the shoulders 18 of the body 14. The camera 10 pivots via the neck 12 in an up-and-down manner as indicated by arrows 13 (FIG. 2). In FIGS. 2–7, the neck 12 and body 14 are generally aligned in an upright position. The body 14 can be folded around the neck 12 as shown in the folded position of FIG. 1. The neck 12 typically is detachably connected to the camera 10, for instance, by a press fit, a threaded connection, or the like. In one specific embodiment, the connection between the camera 10 and the neck 12 is fixed. In another embodiment, the connection allows rotation of the camera 10 with respect to the neck 12 along arrows 17 to produce side-to-side movement of the camera 10 (FIG. 2). The body 14 is a longitudinal body having an axis 19. In the upright position as shown in FIG. 2, the neck 12 is generally aligned with the body axis 19, so that the side-to-side rotation 17 is around the body axis 19. The neck pivot axis 16 is generally perpendicular to the body axis 19. As best seen in FIGS. 3, 4, 6, and 7, the neck pivot axis 16 may be perpendicular to the midplane MP of the body 14 on which the body axis 19 lies.

Figure 4:
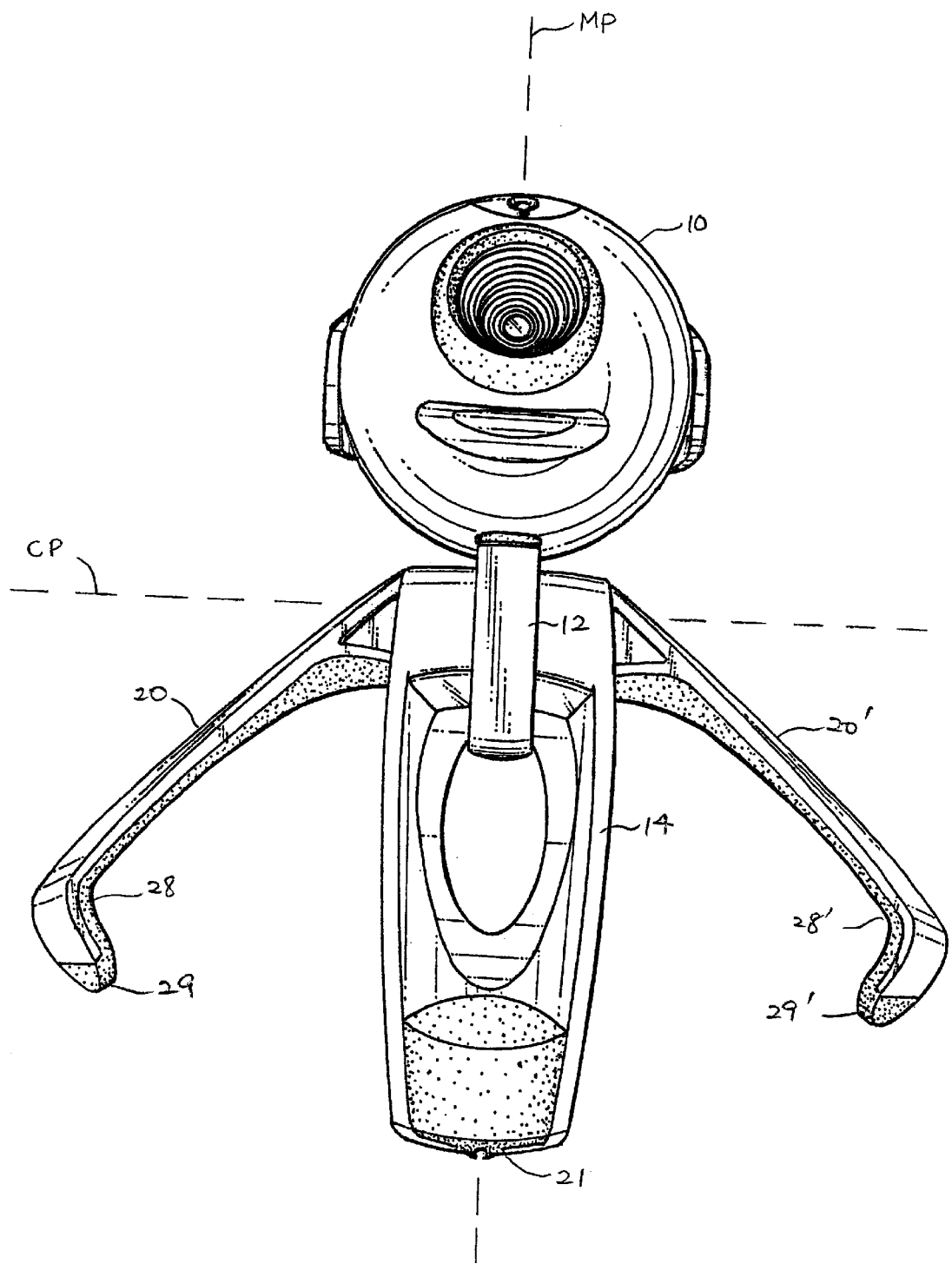
FIG. 4 is a front elevational view of the support device of FIG. 2.
Figure 5A:
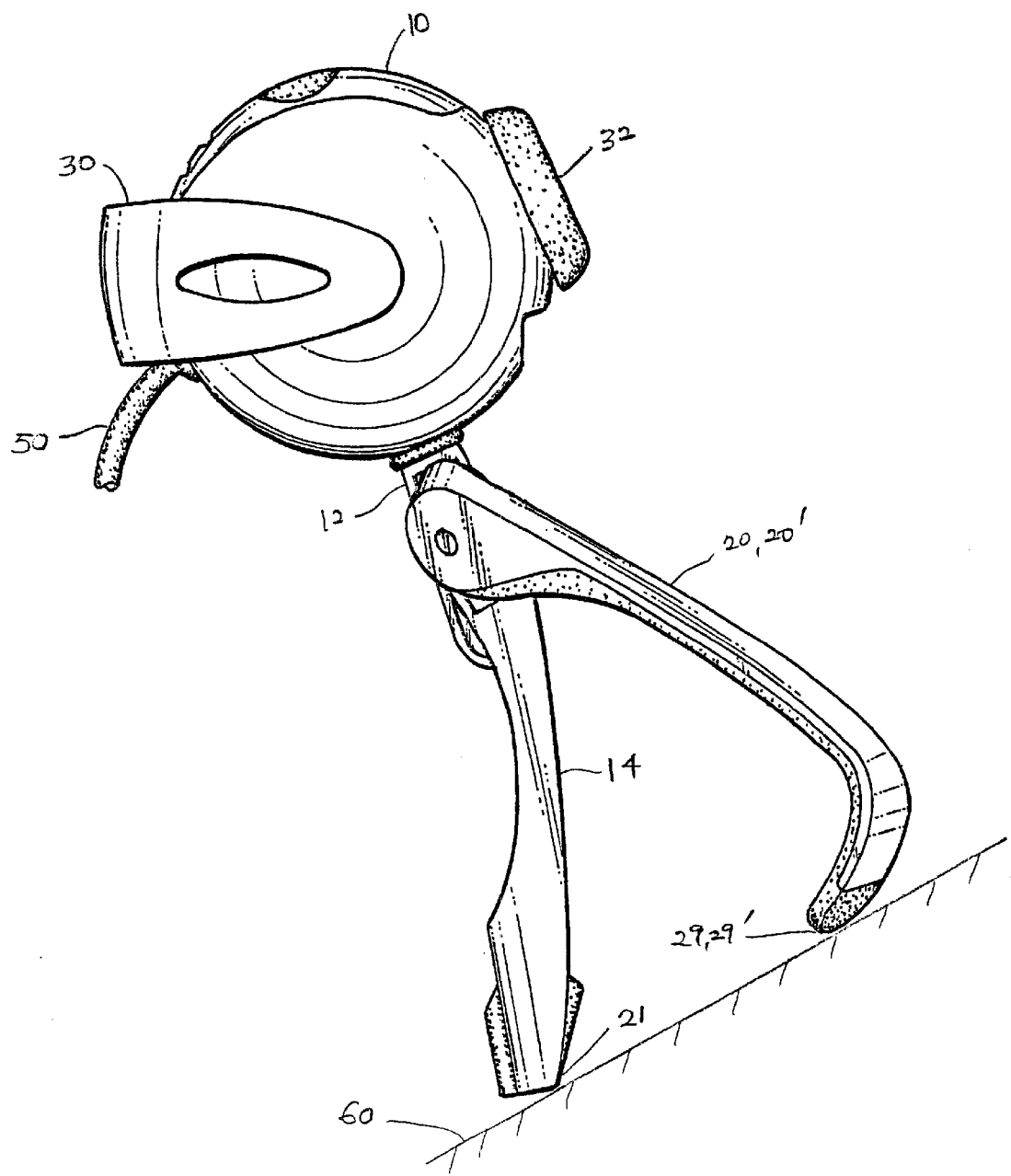
FIGS. 5A and 5B are side elevational views of the support device of FIG. 2 illustrating different dispositions of supporting the camera.
Figure 5B:
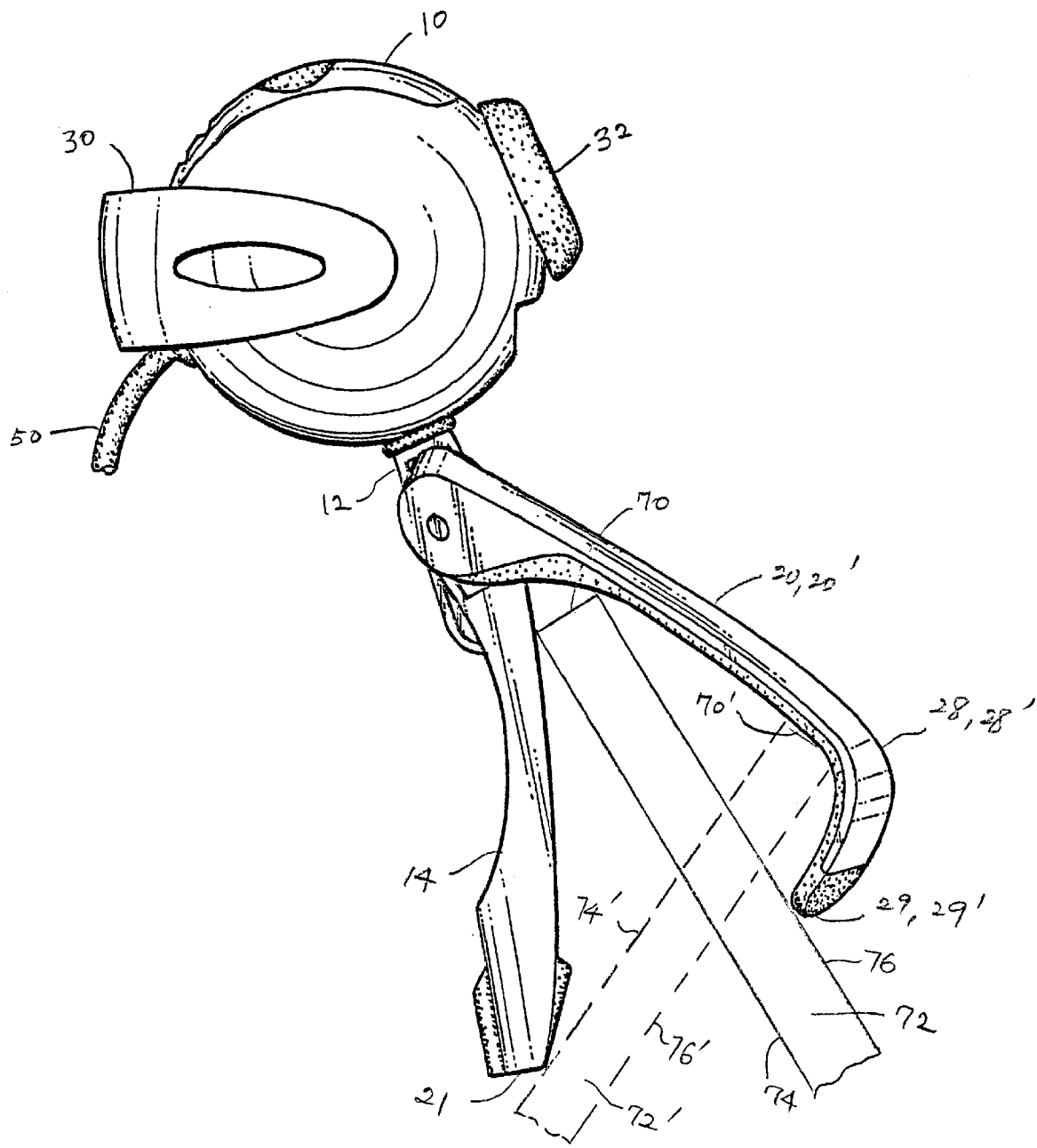
Figure 6:
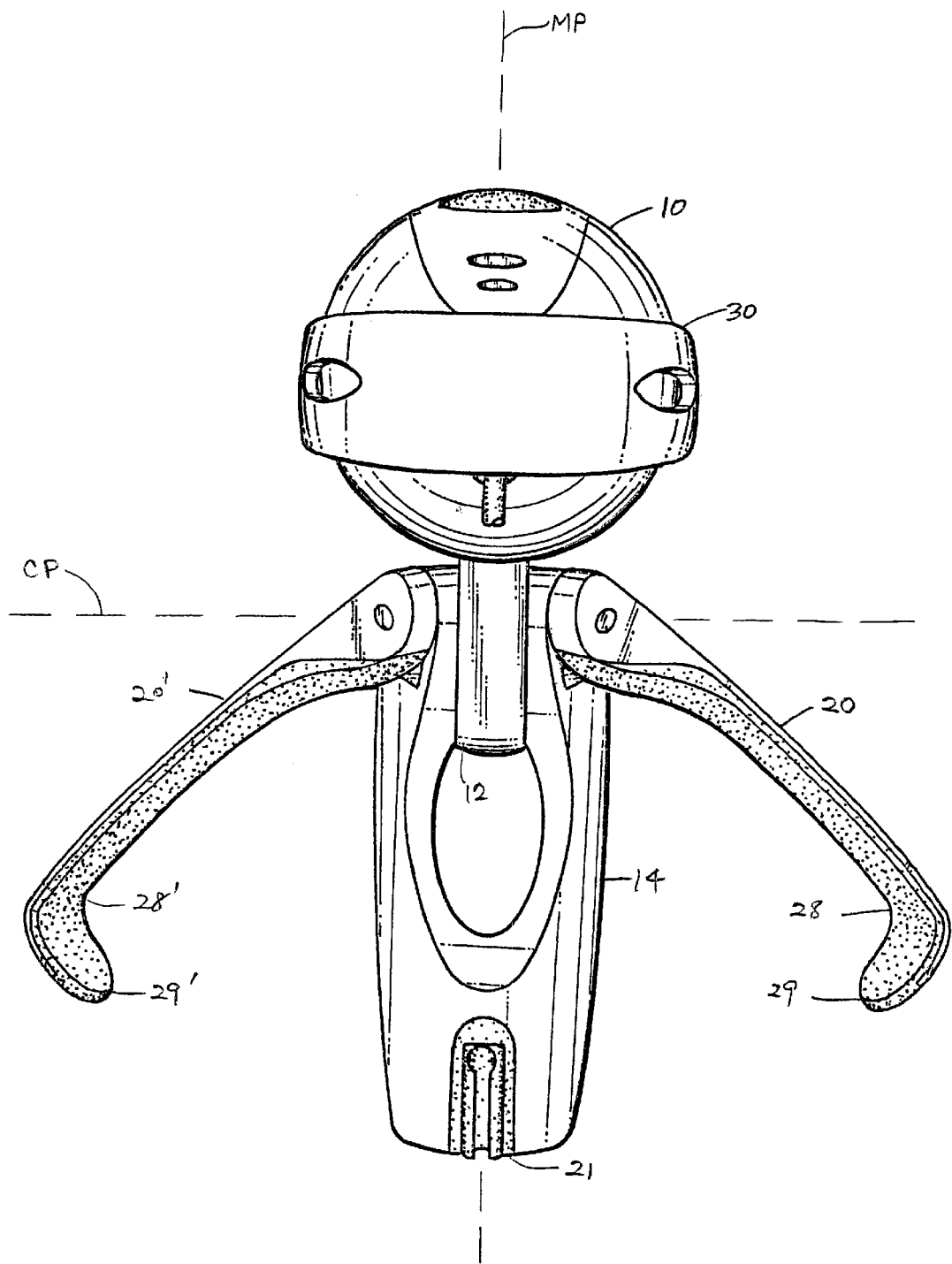
FIG. 6 is a rear elevational view of the support device of FIG. 2.
Figure 7:
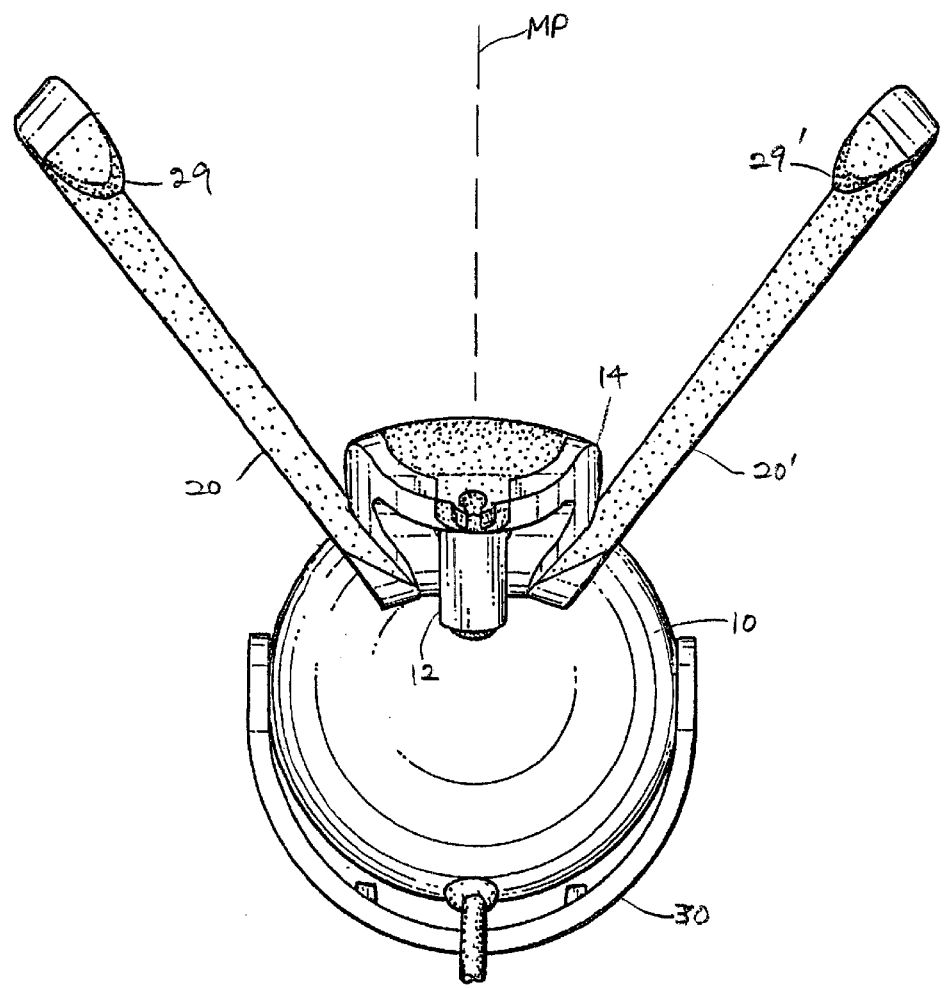
FIG. 7 is a bottom plan view of the support device of FIG. 2.

A pair of arms 20, 20' are rotatably connected to the shoulders 18 to swing away from the body 14 from the collapsed or retracted position illustrated in FIG. 1. FIGS. 2–7 show the arms 20, 20' in the extended or open position, while FIG. 1 shows the arms disposed adjacent the body 14 in the retracted position. The support frame is typically symmetrical with respect to the midplane MP, although the arms 20, 20' may be positioned differently relative to the midplane MP. The arms 20, 20' are each connected to the shoulders 18 at an angle and rotate independently of one another. The right arm 20 rotates around a right pivot axis 26, and the left arm 20' rotates around a left pivot axis 24 as shown in FIG. 2. The distance between the arms 20, 20' increases as the arms 20, 20' swing outward away from the body 14. The left pivot axis 24 is spaced from the neck pivot axis 16 by a left pivot angle 25. The left pivot axis 26 is spaced from the neck pivot axis 16 by a right pivot angle 27 which is opposite from the left pivot angle 25. The left pivot angle 25 may be equal in magnitude to the right pivot angle 27, which is typically about 20°–70°, but may be smaller or larger as desired. In one specific embodiment, the left pivot axis 24 and right pivot axis 26 are generally perpendicular to the body axis 19. In that case, the left pivot axis 24 and right pivot axis 26 may lie on a common plane CP which is perpendicular to the midplane MP of the body 14 (FIGS. 4 and 6). The neck pivot axis 16 may also lie on the same plane CP, but is spaced slightly below the plane in the specific embodiment shown. In other embodiments, the left pivot axis 24 and right pivot axis 26 are not perpendicular to the body axis 19. In one specific embodiment, the arms 20, 20' are configured to be angularly displaceable from the body 14 by less than about 80°, but the angle of displacement may be larger or smaller in other embodiments.

The use of the body axis 19 is a convenient reference for defining the relative positions of the other components of the support frame relative to the body 14. In alternative embodiments, the body 14 may have other shapes for which a body axis is not readily ascertainable and may need to be arbitrarily defined. Thus, the invention is not limited to a longitudinal body or the like with an obvious axis.

The arms 20, 20' are generally longitudinal members. In the specific embodiment shown, the arms 20, 20' have hooked distal portions 28, 28' terminating at distal ends 29, 29'. The hooked distal portions 28, 28' desirably are oriented so that the distal end ends 29, 29' are pointed toward the body 14. The arms 20, 20' may be approximately equal in length to the body 14 so that in the collapsed position, the distal ends 29, 29' of the arms 20, 20' are disposed adjacent the distal end 21 of the body 14.

A separate cover in the form of a visor 30 is rotatably coupled to the camera 10 to protect the lens 32 as shown in FIG. 1. During operation, the visor 30 is swung behind the camera 10 to expose the lens 32, as seen in FIGS. 2–7. The visor 30 is not coupled with and forms no part of the support frame for the camera 10. A cable 50 extends from the back of the camera 10 as best seen in FIGS. 5A and 5B.

The support frame can be used to support the camera 10 in different dispositions. For example, in a first disposition FIG. 5A shows the distal end 21 of the body 14 and the distal ends 29, 29' of the extended or open arms 20, 20' disposed on a surface 60, which may be planar, to support the camera 10 over the surface 60. The body 14 and arms 20, 20' form a tripod-like structure. In a second disposition as seen in FIG. 5B, the support frame straddles an edge 70 to support the camera 10 on the edge 70 of an object 72, which may be, for example, the edge of the display of a laptop computer. The body 14 is disposed on the back side of the object 72 facing the back surface 74, while the arms 20, 20' are disposed on the front side of the object 72 facing the front surface 76. The distal ends 29, 29' of the arms 20, 20' may contact the front surface 76. The position of the support frame on the object 72 may change. For example, FIG. 5B shows another position of the object 72' in broken lines, in which the distal end 21 of the body 14 contacts the back surface 74' and the hooked portions 28, 28' of the arms 20, 20' engage the edge 70'. Different positions of the support frame may be achieved by adjusting the arms 20, 20' and varying the positions relative to the object or surface on which to place the body 14 and arms 20, 20'.

The above-described arrangements of apparatus and methods illustrative of applications of the principles of this invention and many other embodiments and modifications may be made without departing from the spirit and scope of the invention as defined in the claims. For example, the shapes and sizes of the body, neck, and arms may be changed. The scope of the invention should, therefore, be determined not with reference to the above description, but instead should be determined with reference to the appended claims along with their full scope of equivalents.

What is claimed is:

1. A device for supporting a camera, the device comprising:
    a neck configured to connect with the camera;
    a body having a body axis and being rotatably connected with the neck to pivot relative to the neck around a neck pivot axis which is generally perpendicular to the body axis;
    a left arm rotatably connected with the body to pivot relative to the body around a left pivot axis, the left pivot axis being nonparallel to the neck pivot axis; and
    a right arm rotatably connected with the body to pivot relative to the body around a right pivot axis, the right pivot axis being nonparallel to the neck pivot axis,
    wherein the left pivot axis is nonparallel to the right pivot axis.

2. The device of claim 1 wherein the right pivot axis is generally perpendicular to the body axis.

3. The device of claim 2 wherein the left pivot axis is generally perpendicular to the body axis.

4. The device of claim 3 wherein the left pivot axis is spaced from the neck pivot axis by a left pivot angle and the right pivot axis is spaced from the neck pivot axis by a right pivot angle which is opposite from the left pivot angle.

5. The device of claim 4 wherein the right pivot angle and the left pivot angle are substantially equal in magnitude.

6. The device of claim 5 wherein the right pivot angle and the left pivot angle are about 20°–70° in magnitude.

7. The device of claim 1 wherein the left arm and right arm are movable relative to the body between a collapsed position and an extended position, the left and right arms being disposed adjacent the body in the collapsed position, the left and right arms being angularly spaced from the body axis of the body in the extended position.

8. The device of claim 7 wherein the body and the left and right arms are configured to contact a planar surface at three spaced contact locations, respectively, in the extended position to support the camera on the planar surface.

9. The device of claim 7 wherein the body and the left and right arms are configured to straddle an edge in the extended position to support the camera on the edge, the body being disposed on one side of the edge and the left and right arms being disposed on another side of the edge opposite from the body.

10. The device of claim 1 wherein the left and right arms each include a hooked distal end.

11. The device of claim 1 wherein the left arm and the right arm are pivotable relative to the body independently of one another.

12. A device for supporting a camera, the device comprising:
   a neck configured to connect with the camera;
   a body having a body midplane and being rotatably connected with the neck to pivot relative to the neck around a neck pivot axis which is generally perpendicular to the body midplane;
   a left arm rotatably connected with the body to pivot relative to the body; and
   a right arm rotatably connected with the body to pivot relative to the body, the left arm and the right arm being independently movable to pivot separately relatively to the body,
   wherein the left arm is pivotable relative to the body around a left pivot axis nonparallel to the neck pivot axis, and the right arm is pivotable relative to the body around a right pivot axis nonparallel to the neck pivot axis.

13. The device of claim 12 wherein the left pivot axis and the right pivot axis lie on a common plane which is generally perpendicular to the body midplane.

14. The device of claim 13 wherein the left pivot axis is spaced from the neck pivot axis by a left pivot angle and the right pivot axis is spaced from the neck pivot axis by a right pivot angle.

15. The device of claim 14 wherein the left pivot angle and the right pivot angle are substantially equal in magnitude and are spaced from the neck pivot axis in opposite directions.

16. A device for supporting a camera, the device comprising:
   a body being configured to support the camera;
   a left arm rotatably connected with the body to pivot relative to the body around a left pivot axis; and
   a right arm rotatably connected with the body to pivot relative to the body around a right pivot axis, the right pivot axis being nonparallel to the left pivot axis,
   wherein the left arm and right arm are movable relative to the body between a collapsed position and an extended position, the left and right arms being disposed adjacent to the body in the collapsed position, the left and right arms being angularly spaced from the body axis of the body in the extended position,
   wherein the body and the left and right arms are configured to contact a planar surface at three spaced contact locations, respectively, in the extended position to support the camera on the planar surface in a first disposition, and
   wherein the body and the left and right arms are configured to straddle an edge in the extended position to support the camera on the edge in a second disposition, the body being disposed on one side of the edge and the left and right arms being disposed on another side of the edge opposite from the body.

17. The device of claim 16 further comprising a neck configured to connect with the camera, wherein the body is rotatably connected with the neck to pivot relative to the neck around a neck pivot axis which is nonparallel to the left pivot axis and the right pivot axis.

18. The device of claim 17 wherein the neck pivot axis is generally perpendicular to a midplane of the body.

19. A device for supporting a camera, the device comprising:
   a neck configured to connect with the camera;
   a body having a body axis and being rotatably connected with the neck to pivot relative to the neck around a neck pivot axis which is generally perpendicular to the body axis;
   a left arm rotatably connected with the body to pivot relative to the body around a left pivot axis, the left pivot axis being nonparallel to the neck pivot axis; and
   a right arm rotatably connected with the body to pivot relative to the body around a right pivot axis, the right pivot axis being nonparallel to the neck pivot axis,
   wherein the left arm and right arm are movable relative to the body between a collapsed position and an extended position, the left and right arms being disposed adjacent the body in the collapsed position, the left and right arms being angularly spaced from the body axis of the body in the extended position,
   wherein the body and the left and right arms are configured to straddle an edge in the extended position to support the camera on the edge, the body being disposed on one side of the edge and the left and right arms being disposed on another side of the edge opposite from the body.

20. The device of claim 19 wherein the left arm and the right arm are pivotable relative to the body independently of one another.

* * * * *